(12) United States Patent
Albanese et al.

(10) Patent No.: US 6,385,833 B1
(45) Date of Patent: May 14, 2002

(54) APPARATUS FOR INSTALLING WEATHERSTRIPPING INTO FRAMES

(75) Inventors: James V. Albanese, Lyons; Daniel W. Richter, Farmington, both of NY (US)

(73) Assignee: Ultrafab, Inc., Farmington, NY (US)

( * ) Notice: Subject to any disclaimer, the term of this patent is extended or adjusted under 35 U.S.C. 154(b) by 0 days.

(21) Appl. No.: 09/655,588

(22) Filed: Sep. 6, 2000

(51) Int. Cl.[7] .............................................. B23P 19/02
(52) U.S. Cl. ........................ 29/235; 29/451; 29/243.58
(58) Field of Search ......................... 29/235, 270, 278, 29/450; 404/87, 74; 425/458, 87; 140/109; 81/3 R, 9.1 R, 8.1 R

(56) References Cited

U.S. PATENT DOCUMENTS

| | | | | |
|---|---|---|---|---|
| 4,528,736 A | * | 7/1985 | Hope | 29/235 |
| 4,843,701 A | * | 7/1989 | St. Angelo | 29/235 |
| 5,103,547 A | * | 4/1992 | Holloway | 29/451 |
| 5,940,950 A | * | 8/1999 | Galat | 29/235 |
| 5,979,036 A | * | 11/1999 | Socci | 29/235 |

* cited by examiner

Primary Examiner—Joseph J. Hail, III
Assistant Examiner—Daniel Shanley

(74) Attorney, Agent, or Firm—Kenneth J. LuKacher; Martin LuKacher

(57) ABSTRACT

In order to facilitate the installation of weatherstripping into channels, usually T-slots, of frames in windows and doors, variations in size of the slots is accommodated by changing the size of interference members extending from the backing strip of the weatherstripping. A forming tool, such as a shaft having a forming surface or on which a forming roller is movably mounted in a support structure. The support structure is disposed adjacent the mechanism of the insertion apparatus which feeds the weatherstrip into the T-slot of the frame. The support has a channel via which the weatherstrip passes into the insertion mechanism and thence into the T-slot in the frame. A wall in the support member presents the forming tool to the interference portions of the backing strip of the weatherstripping and is operative to swage and crimp or otherwise change the cross sectional size of the backing strip in relationship to the size of the T-slot which receives the backing strip. The forming tool is displaced so as to select the amount of crimping and enable as long a length of weatherstripping as is required to be installed in the frame without overloading and stalling the insertion mechanism. The size and disposition of the forming tool in the support may be selected to accommodate different styles of interference member on the backing strip. The installation apparatus is therefore universally adapted for various types of weatherstripping.

15 Claims, 6 Drawing Sheets

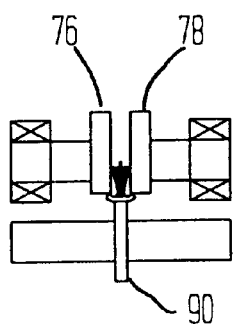 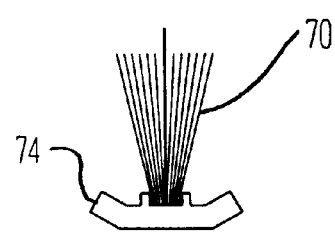
FIG. 23B          FIG. 23A
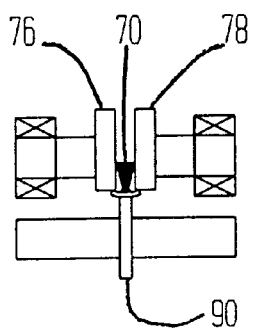 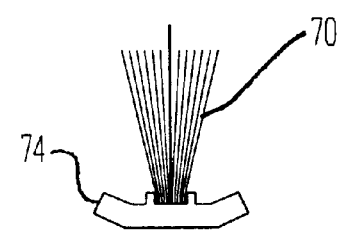
FIG. 24B          FIG. 24A
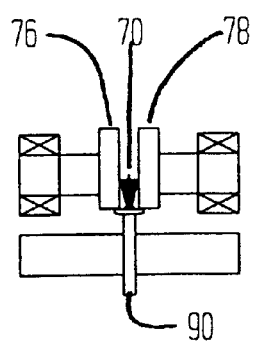 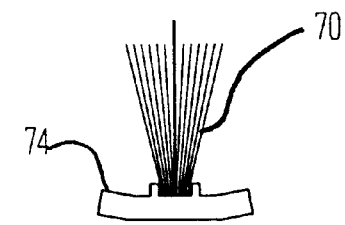
FIG. 25B          FIG. 25A

APPARATUS FOR INSTALLING WEATHERSTRIPPING INTO FRAMES

DESCRIPTION

The present invention relates to apparatus or placement or installation of weatherstripping into members, such as the frames of windows and doors, and more particularly enables the accommodation of weatherstripping having interference portions which restrict the movement of the weatherstripping in the frame or door after installation, while accommodating variations in size or tolerance in the slot, usually a T-slot in the frame member into which the weatherstripping is installed.

It is a feature of the invention to provide apparatus which is universally adapted for use with different designs or styles of weatherstripping and facilitates installation of the weatherstripping by preventing overloading of the insertion mechanism of automatic weatherstripping insertion apparatus.

Conventionally, weatherstripping is inserted in T-slots by feeding the weatherstripping through the slot from one end thereof. The weatherstripping may have a backing strip from which a row of pile extends. Such weatherstripping may also have interference members for restricting the movement of the weatherstripping in the frame after installation thereby ensuring that the weatherstripping does not slip, and sealing as provided by the weatherstripping, notwithstanding movement of the sash or frame of the windows of doors, is maintained.

By way of background, one style of machine for insertion of weatherstripping is shown in Miller et al, U.S. Pat. No. 5,758,400 issued Jun. 2, 1998. Weatherstripping having backing strip with interference members, which may be installed through use of apparatus provided by the invention, is described in Johnson, U.S. Pat. No. 5,438,802 issued Aug. 8, 1995.

The T-slots in frames of windows and doors, particularly vinyl windows, may vary in size sufficiently to prevent reliable installation of the weatherstripping, especially by insertion and feeding of the weatherstripping into an open end of the T-slot. When the T-slot opening is too tight, the insertion mechanism can be overloaded, particularly for long lengths of T-slot, stalling the insertion mechanism. Then resort must be had to insertion from the top of the T-slot, as with rollers which engage and bend the backing strip. Such roll in devices are mentioned in the above referenced Johnson patent. Roll in can increase the labor required to install the weatherstripping and is desirably avoided. The present invention increases the practicability of weatherstripping insertion apparatus by facilitating the use of mechanisms which enable automatic insertion of the weatherstripping into the T-slot from one end of the frame.

Accordingly, it is the object of this invention to provide improved apparatus for facilitating the placement of weatherstripping in channels designed to receive weatherstripping; which channels may be in the frames or sash of windows or doors into which the window sash is received.

It is a further object of the present invention to provide apparatus which facilitates placement of weatherstripping, and universally accommodates various styles of weatherstripping as well as tolerances in the cross section of the channels in which the weatherstripping is placed.

It is a still farther object of the present invention to provide apparatus for reducing the cost of installation of weatherstripping.

Briefly described, the invention is adapted for use in apparatus for placement of a weatherstrip into a channel in a member from which a sealing portion of the weatherstripping extends outwardly into sealing relationship with another member. The weatherstrip has portions which are engagable with the channel to restrict movement of the weatherstrip when placed in the channel. The apparatus includes a forming tool and a support in which the tool is mounted for movement with respect to a passage through the support via which the weatherstrip passes into the mechanism for driving the weatherstrip into the end of the channel, thereby installing the weatherstrip. The forming tool reforms as by swaging, the portions of the weatherstrip which may interfere with the insertion while leaving enough of the members to provide an interfering relationship and restrict the movement of the weatherstrip after installation. The weatherstrip has a backing member of visco-elastic material, such as a plastic, preferably a polyolefin such as polypropylene, which is reformed as by swaging or crimping so as to change the size of the interference portions so as to accommodate the channel in the member in which the weatherstripping is installed. The forming tool therefore controls the magnitude of restriction of movement of the weatherstrip engendered by the interference portions thereof. The amount of control is adjustably by displacing the forming tool so as to accommodate a large variation in the size (the cross section) of the channel in the frame member into which the weatherstrip is placed or the length of the frame (along slot exerting a greater restraining force against insertion of the weatherstripping). The tool may be mounted on a cam or eccentric shaft for this purpose. Placement of the weatherstrip by insertion and feeding or drawing into the frame member slot is thereby facilitated.

The foregoing and other objects, features and advantages of the invention will become more apparent from a reading of the following description in connection with the accompanying drawings in which.

Figure 3:
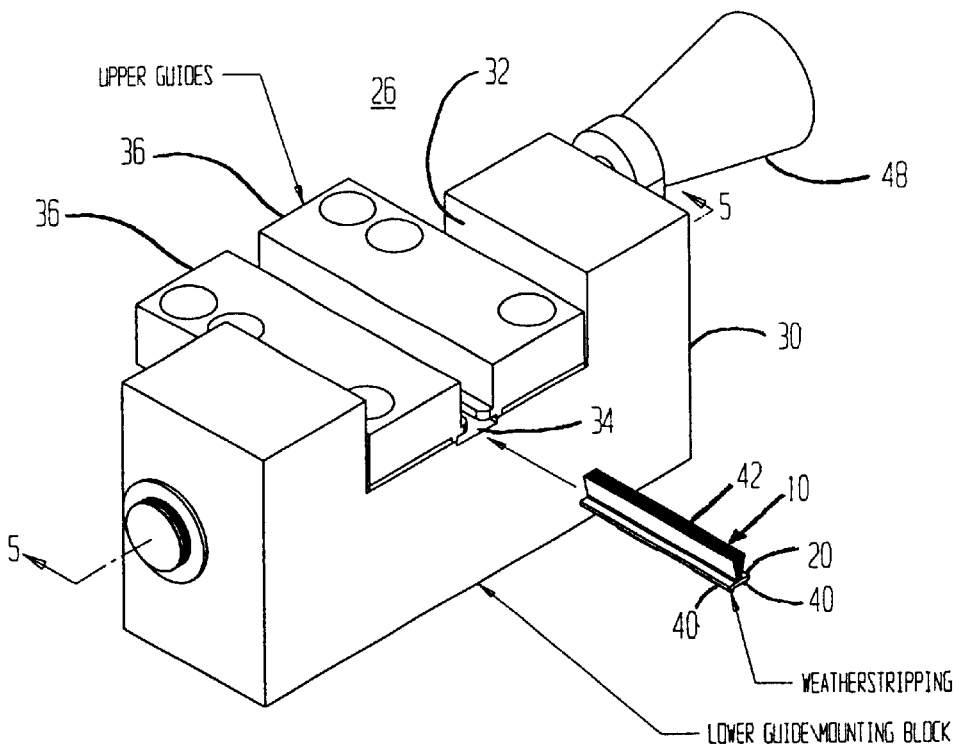
FIG. 3 is an isometric view of the apparatus for controlling the size of the weatherstripping to facilitate the operation of the apparatus, the view being taken from the front where the weatherstripping is fed into the installation apparatus.
Figure 4:
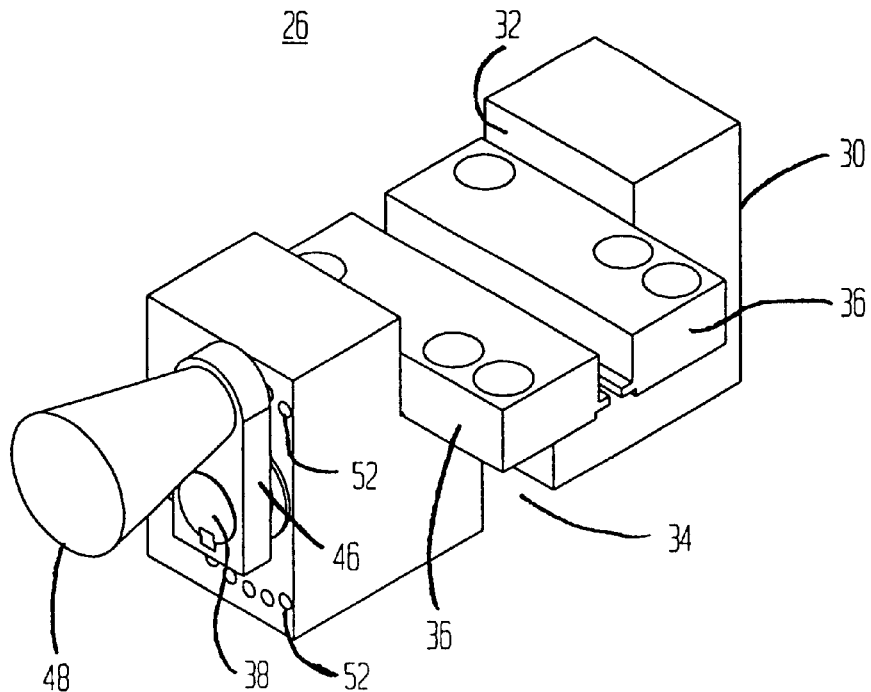
FIG. 4 is an isometric view of the apparatus shown in FIG. 3, but taken from the rear where the apparatus is disposed adjacent to the feeding and weatherstrip length measurement mechanism of the insertion apparatus.
Figure 17A:
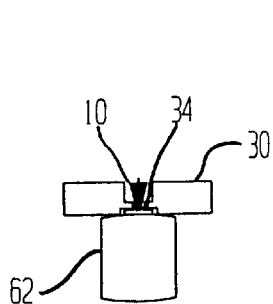
Figure 17B:
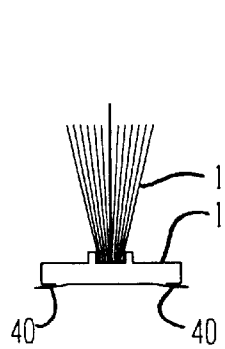
Figure 17C:
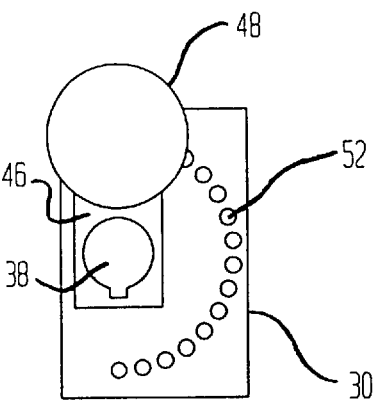
Figures 18A, 18B, 18C:
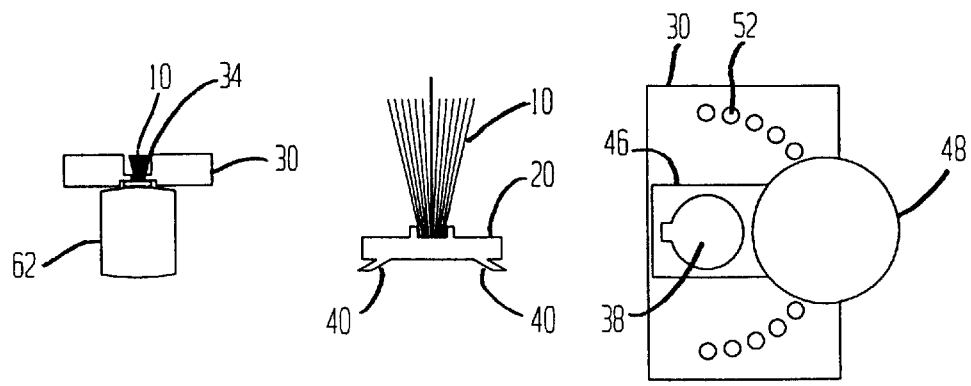
Figures 19A, 19B, 19C:
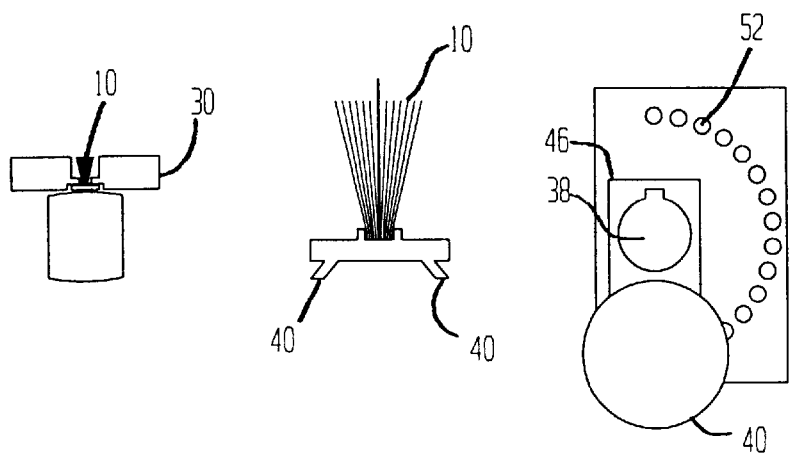
Figures 20, 21:
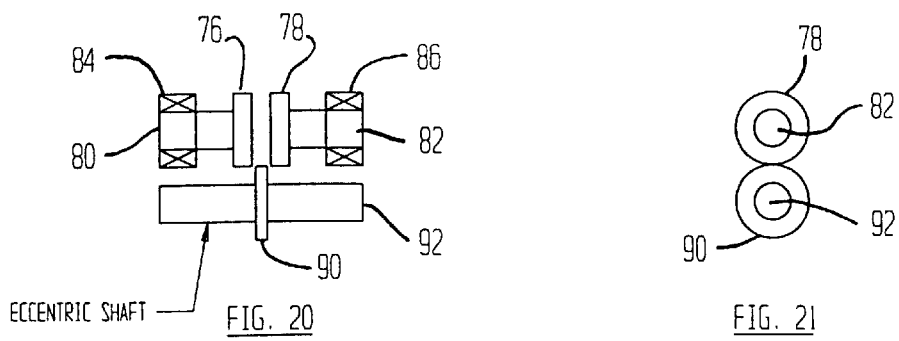
Figure 22:
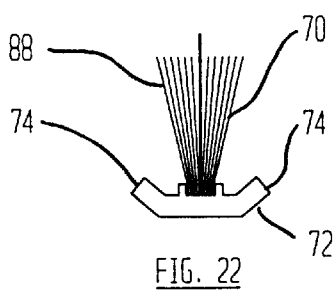

FIGS. 17A, 17B, and 17C are respectively a cross-sectional view of the weatherstrip in the support to lock in swaging relationship with the roller of the forming tool, a cross-sectional view of the reformed weatherstripping, and a side view from the right in FIG. 3 and left in FIG. 4, the views showing the operation of the apparatus in crimping, thereby crushing interference members essentially fully;

FIGS. 18A, 18B, and 18C are views similar to FIGS. 17A, B, and C which show crimping and crushing of approximately ¾ of the projection of the interference members;

FIGS. 19A, 19B, and 19C are views similar to FIGS. 17A, B, and C showing the operation of the apparatus in crimping to approximately ½ full projection (½ crush) of the interference members;

FIGS. 20 and 21 are front and end views schematically illustrating a tool, embodying the invention, adapted for reforming another style of weatherstripping shown in FIG. 22, having interference members which are provided by flaring sides of the backing of the weatherstripping; and FIGS. 23A, 23, 24 and 24B and FIGS. 25A and 25B, respectively, are cross-sectional views of the weatherstripping shown in FIG. 22 after experiencing different amounts of crimping and views of the apparatus shown in FIGS. 20 and 21 in different positions, which by virtue of the visco elastic nature of the material of the backing strip is permanently set through the use of the reforming tool illustrated in FIGS. 20 and 21, and views of that tool reforming the weatherstripping to different extents.

Figure 1:
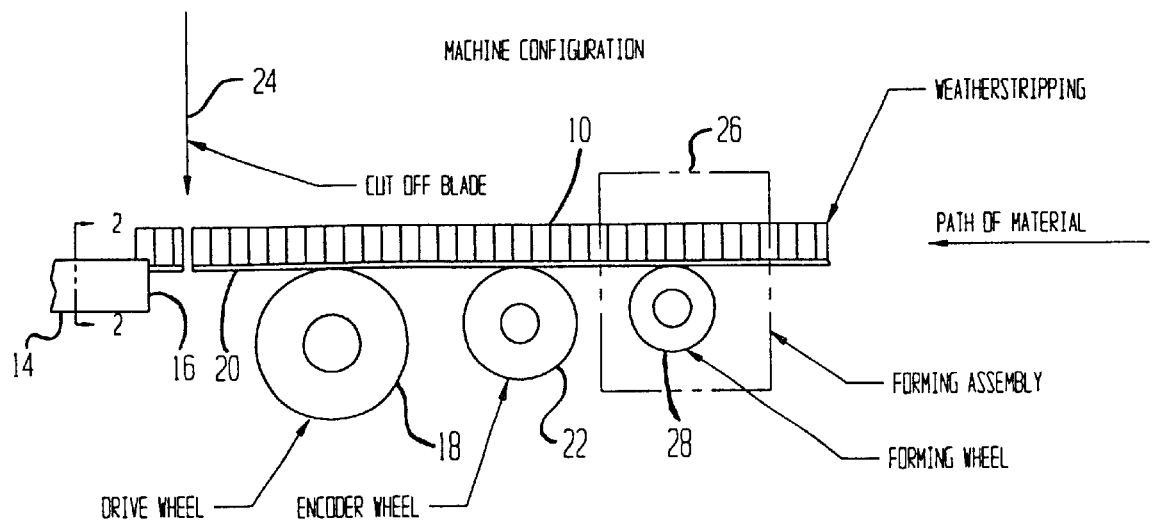
FIG. 1 is a schematic diagram of apparatus for installation of weatherstrip into a T-slot of frame member.
Figure 2:
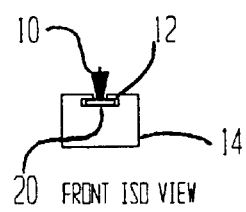
FIG. 2 is an end view taken along the line 2—2 in FIG. 2.

Referring to FIGS. 1 and 2, there is shown a weatherstrip 10 of the type shown in the above referenced Johnson patent, being inserted into a T-slot 12 in a frame member of a door or in which a window sash is movable. This frame member is indicated at 14. The weatherstripping is placed or inserted in the slot 12 from an end 16 of the frame member 14 for the insertion mechanism utilizes a drive wheel 18 which frictionally engages the backing member 20 of the weatherstripping and drives it through the slot, the insertion is automatically controlled by an encoder wheel 22, the rotations of which are a measure of the length of weatherstripping 10 driven into the slot 12 by the drive wheel 18. When the weatherstripping of desired length is fed into the slot, a cutoff blade indicated at 24, severs the weatherstripping.

Reforming apparatus 26 including a reforming wheel 28 is disposed in the path of the weatherstripping ahead of the insertion mechanism (upstream of the encoder 22) in order to change the size of interference portions or members of the weatherstripping so as to enable the weatherstripping to be fed into the member through the slot without overloading the driving wheel, thereby accommodating variations in tolerance of the weatherstripping backing member 20 with respect to the slot 12.

Figure 5:
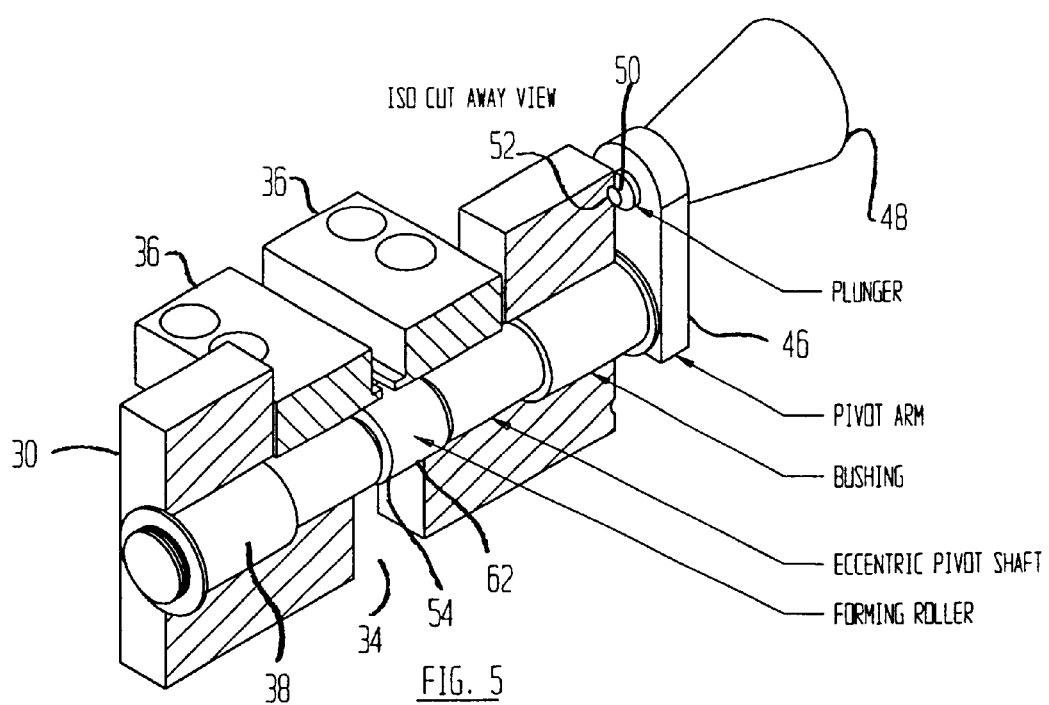
FIG. 5 is a sectional view taken through the axis of rotation of the forming tool of the apparatus shown in FIG. 3, the view being taken along the line 5—5 in FIG. 3.

Referring to FIGS. 3, 4, and 5, there is shown the reforming apparatus 26 which is constituted of a mounting block 30 having a notch 32 which may extend to a slot 34 at the rear thereof for assisting in clearing possible jams of the weatherstripping 10 when it passes through a guide slot 34, the slot 34 is formed by space guide bars 36 which are assembled in the notch 32. The block 30 and bar 36 providing the support mounting the weatherstripping during reforming as the weatherstripping is driven by the drive mechanism including the drive wheel 18 through the slot 34.

Figure 16:
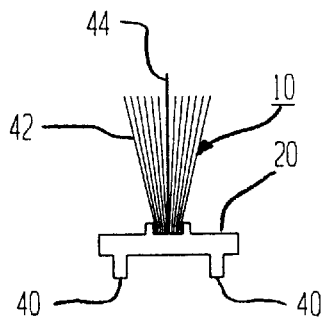
FIG. 16 is a cross-sectional view of a weatherstrip which is not reformed or where the forming tool is displaced to a position out of contact with the interference members of the weatherstripping.

A shaft 38 is journaled in the block 30 for eccentric rotation about an axis offset from the axis of the shaft. This offset is at least a distance between interference members extending from the backing 20 of the weatherstripping 10 are to be swaged or crimped. FIG. 16 illustrates these interference members 40 in greater detail. The weatherstrip has a sealing portion 42 including a thin 44, also shown in greater detail in FIG. 16.

Figure 6:
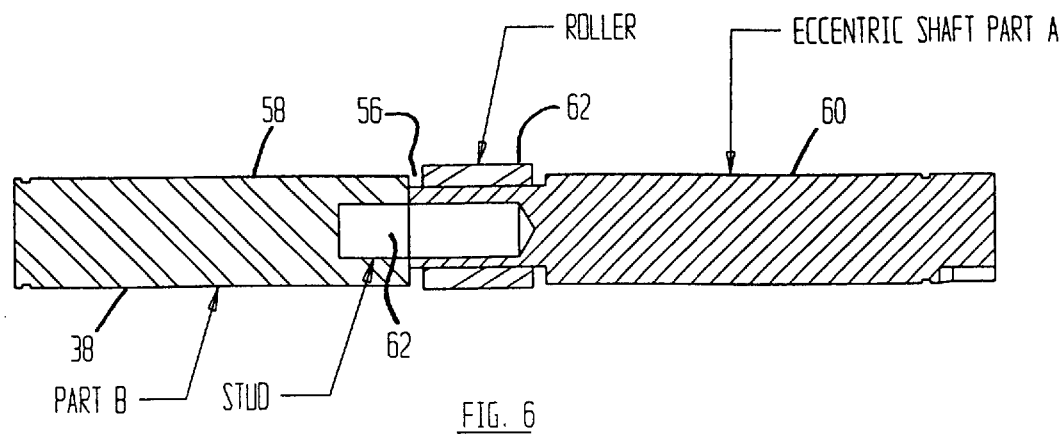
FIGS. 6 and 7 are a sectional view and an end view of the forming tool shown in FIG. 5; the sectional views being taken along line 6—6 in FIG. 7.
Figure 7:
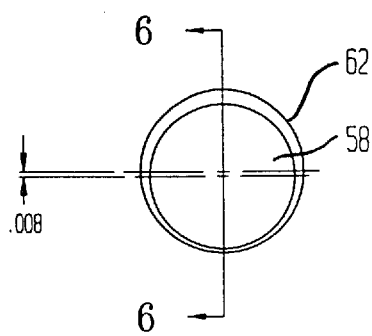

The shaft 38 is attached to an arm 46 as by being keyed thereto. A knob 48 for turning the arm projects from the outside of the arm 46. The inside of the arm has a detent mechanism including a spring biased plunger 50 which snaps into holes 52 spaced around an arc on the side of the block 30. The plunger snaps into a desired hole thereby turning the shaft and locking it at a desired angular displacement corresponding to the amount of reforming or crimping, by swaging action, of the forming tool. This forming tool is provided by the eccentric shaft 38 and a forming roller 54 which is rotatable about an inwardly stepped section 56 of the shaft. This section may be at the end of two parts 58 and 60 of the shaft which are pinned together with a tapered stud 62 (see FIGS. 6 and 7). A forming roller 62 is a short sleeve or tube which can rotate on the step section 56 of the shaft 38. Since the shaft is eccentrically mounted, the distance between the underside of the weatherstrip backing from which the interference members 40 extend and the surface of the forming roller 62 is varied as the shaft 38 is rotated by the arm 46. The change in spacing to effect different amounts of crimping or crush formed by swaging of the interference members 40 when the arm 46 is in different positions is illustrated in FIGS. 17, 18 and 19.

Figure 10:
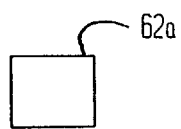
FIGS. 10 and 11 are front and end views, respectively, of the forming roller which may be used in the forming tool and mounted for rotation about the stepped portion of the shaft thereof.
Figure 11:
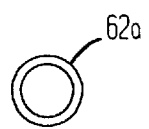
Figure 12:
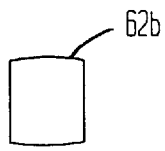
FIGS. 12 and 13 are front and end views of another forming roller.
Figure 13:
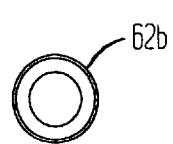
Figure 14:
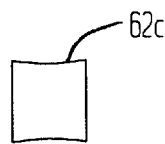
FIGS. 14 and 15 are front and end views of still another forming roller.
Figure 15:
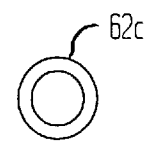

The forming roller 62 may be of constant diameter as shown in FIGS. 10 and 11 at 62A the roller 62 maybe convex as shown in FIGS. 17A, 18A and 19A and at 62B in FIG. 13. The roller also may be concave as shown at 62C in FIGS. 14 and 15. The shape of the forming surface depends upon the type of interference portions of the weatherstripping since the shape affects swaging either inwardly, outwardly or perpendicular to the backing 20 of the weatherstripping as desired.

The weatherstripping is made of plastic from preferably a polyolefin, especially polypropylene. This material is visco-elastic and retains a permanent set or crimp after swaging as by the reforming tool.

Figure 8:
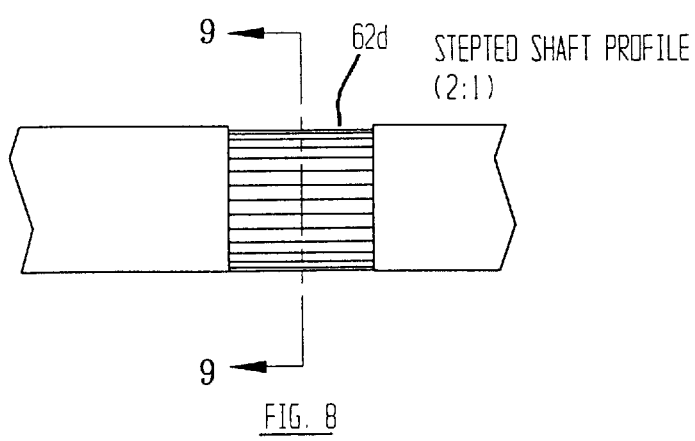
FIG. 8 is a fragmentary view of another type of forming tool which utilizes a step shaft having flats for engaging and crimping interference portions of the weatherstripping.
Figure 9:
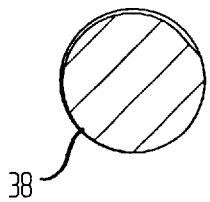
FIG. 9 is a sectional view taken along the line 9—9 in FIG. 8.

As shown in FIGS. 8 and 9, the shaft 38 may have a section 66 formed by longitudinal flats then a roller is not used and the flats themselves facilitate the reforming of the interference members 40. It will be appreciated that the shaft 38 on which the roller 62 or the section 62d having the flats are effectively cammed as the eccentric shaft is rotated selected distances towards the weatherstripping so as to control the amount of reforming.

FIG. 22 illustrates another style of weatherstripping 70 where the backing 72 flares upwardly to define interference portions 74. Such a weatherstripping may be reformed by means of a three roller reforming tool as shown in FIGS. 21 and 22. The reforming rollers 76 and 78 are mounted on eccentric shafts 80 and 82, as by bearings 84 and 86, these shafts may be locked in positions so that they are brought closer to the weatherstripping which is located in a slot in a support mounting in which the shaft 88 and 82 turn. This support mounting may be similar to the mounting 30 with guides 36 to form a slot through which the weatherstrip 70 passes.

Opposite to the center of the backing 72 below the pile 88 of the weatherstripping, is a third roller 90 mounted on a shaft 92. The rollers 76 and 78 are free to turn and move with the weatherstripping. The roller 90 changes the displacement of the weatherstripping in the slot toward the rollers 76 and 78. These rollers act as forming rollers so as to selectively reform the weatherstripping. Effectively the interference portions 74 are swaged downwardly depending upon the displacement of the backing roller 90 with respect to the forming rollers 76 and 78. FIGS. 23, 24 and 25 show how different amounts of crush may be effected by varying the spacing between the rollers 90 and the roller 76 and 78.

From the foregoing description it will be apparent that there have been provided improved apparatus for installing weatherstripping into frames notwithstanding variations in size of the weatherstripping with respect to the slot in the frame in which the weatherstripping is placed and installed. Variations and modifications in the herein described apparatus, within the scope of the invention, will undoubtedly suggest themselves to those skilled in the art. Accordingly the foregoing description should be taken as illustrative and not in a limiting sense.

What is claimed is:

1. An apparatus for placement of a weatherstrip into a channel in a member from which a sealing portion of the weatherstrip extends from the channel outwardly of the member, said weatherstrip having portions which engage said channel to restrict movement of the weatherstrip when placed in the channel, the improvement comprising a forming tool, a support for said tool having a passage via which the weatherstrip passes into said placement apparatus, said forming tool being mounted in said support for movement toward and away from said portions for reforming said portions thereby selectively changing the size relationship between said channel and said portions and controlling the magnitude of restriction of movement of said weatherstrip in said channel engaged by said portions.

2. The apparatus according to claim 1 wherein said weatherstrip has a backing from which said sealing portion extends, which is of backing visco-elastic material, and from which said portions extend into bending relationship with said tool.

3. The apparatus according to claim 2 wherein said bending relationship effects swaging or crimping.

4. The apparatus according to claim 3 wherein said backing strip and portions are plastic.

5. The apparatus according to claim 4 wherein said plastic is a polyolefin, including polypropylene.

6. The apparatus according to claim 1 wherein said weatherstrip has a backing member in the form of a strip from which said members and a row of pile extends, said role of pile providing said sealing portion, said support having a slot via which said strip passes, an opening in a wall of said slot presenting a surface of said backing strip from which said portions extend to said forming tool.

7. The apparatus according to claim 6 wherein said forming tool comprises cam mounting including a shaft rotatable eccentrically about an axis to different positions angularly spaced from each other about said axis thereby to move said tool selectively, effecting different displacements towards and away from said surface of said backing strip and said portions.

8. The apparatus according to claim 7 wherein said shaft is fixedly mounted to an arm extending out of said support on a side of said support, and means on said arms and said sides for locking said arm on said shaft selectively in said different positions thereby changing the spacing between said tool and said portions.

9. The apparatus according to claim 8 wherein said locking means is a detent mechanism.

10. The apparatus according to claim 7 wherein said shaft has steps between which a portion of said shaft extends, said shaft portion facing said slot in said wall.

11. The apparatus according to claim 10 wherein a swaging section of said shaft, having a plurality of flats extends axially of said shaft and are disposed around the periphery of said swaging section.

12. The apparatus according to claim 10 wherein a forming roller is rotatably mounted on said shaft between said steps.

13. The apparatus according to claim 12 wherein said roller has a concave or convex outer peripheral surface.

14. The apparatus according to claim 6 wherein said backing strip surface flares away from a plane generally perpendicular to said row to present said restriction portions, said forming tool comprising rollers mounted in said support and displacable to selected distances in a direction perpendicular to said plane for reforming said surface and changing the altitude of said flare prior to placement in said channel of said member.

15. The apparatus according to claim 14 wherein a pair of said rollers, providing said forming rollers, are spaced laterally on opposite sides of said row, and another roller is disposed in engagement with a surface of said backing strip opposite to the surface thereof from which said sealing portion extends.

* * * * *